United States Patent
Hata et al.

(10) Patent No.: US 8,955,638 B2
(45) Date of Patent: Feb. 17, 2015

(54) HYDRAULIC EXCAVATOR

(71) Applicant: Komatsu Ltd., Tokyo (JP)

(72) Inventors: Takanori Hata, Hirakata (JP); Hiroshi Yamashita, Takatsuki (JP); Kazuyoshi Morimoto, Hirakata (JP); Huzhe Yang, Hirakata (JP); Gary Ryan, Hirakata (JP)

(73) Assignee: Komatsu Ltd., Tokyo (JP)

( * ) Notice: Subject to any disclaimer, the term of this patent is extended or adjusted under 35 U.S.C. 154(b) by 0 days.

(21) Appl. No.: 14/118,409

(22) PCT Filed: Nov. 20, 2012

(86) PCT No.: PCT/JP2012/080010
§ 371 (c)(1),
(2) Date: Nov. 18, 2013

(87) PCT Pub. No.: WO2014/061168
PCT Pub. Date: Apr. 24, 2014

(65) Prior Publication Data
US 2014/0196975 A1  Jul. 17, 2014

(30) Foreign Application Priority Data
Oct. 16, 2012 (JP) .................................. 2012-228793

(51) Int. Cl.
*E02F 9/08* (2006.01)
*E02F 9/18* (2006.01)

(52) U.S. Cl.
CPC ............. *E02F 9/0866* (2013.01); *E02F 9/0883* (2013.01); *E02F 9/18* (2013.01)
USPC .............................. 180/309; 180/296; 60/295

(58) Field of Classification Search
CPC .. E02F 9/0883; E02F 9/0866; F01N 2610/14; F01N 2610/1406; F01N 2610/1433
USPC .............. 180/89.2, 296, 309; 248/49; 60/272, 60/295, 310
See application file for complete search history.

(56) References Cited

U.S. PATENT DOCUMENTS 7,293,375 B2 * 11/2007 Fukushima et al. ............ 37/397
7,419,186 B2 * 9/2008 Murakami et al. ............ 280/781
(Continued)

FOREIGN PATENT DOCUMENTS

JP         11-22574 A       1/1999
JP      2010-261373 A      11/2010
(Continued)

OTHER PUBLICATIONS

International Search Report for PCT/JP2012/080010, issued on Mar. 5, 2013.

(Continued)

*Primary Examiner* — John Walters
*Assistant Examiner* — Brian Swenson
(74) *Attorney, Agent, or Firm* — Global IP Counselors, LLP

(57) ABSTRACT

An exhaust processing unit includes a selective catalytic reduction apparatus which processes exhaust from an engine. A reducing agent injection apparatus is attached to the exhaust processing unit. The reducing agent injection apparatus injects a reducing agent which is supplied to the selective catalytic reduction apparatus. The reducing agent tank and the reducing agent supply pump are arranged outside the engine compartment. The reducing agent tank retains the reducing agent. The reducing agent supply pump supplies the reducing agent from the reducing agent tank to the reducing agent injection apparatus. The reducing agent pipe connects the reducing agent supply pump and the reducing agent injection apparatus. The revolving frame includes a pipe frame. The reducing agent pipe is arranged from the reducing agent supply pump to the reducing agent injection apparatus so as to pass through the inner space of the pipe frame.

14 Claims, 8 Drawing Sheets

(56) References Cited

U.S. PATENT DOCUMENTS

| | | | |
|---|---|---|---|
| 8,186,156 B2 * | 5/2012 | Kamiya et al. | 60/420 |
| 8,549,847 B2 * | 10/2013 | Kamiya et al. | 60/299 |
| 8,708,087 B2 * | 4/2014 | Kashu et al. | 180/296 |
| 2004/0261299 A1 * | 12/2004 | Murakami | 37/347 |
| 2010/0266458 A1 * | 10/2010 | Takeshita et al. | 422/109 |
| 2012/0247861 A1 | 10/2012 | Mizuno et al. | |

FOREIGN PATENT DOCUMENTS

| | | |
|---|---|---|
| JP | 2010-285814 A | 12/2010 |
| JP | 2012-62691 A | 3/2012 |
| JP | 2012-62693 A | 3/2012 |
| WO | 2011/152306 A1 | 12/2011 |

OTHER PUBLICATIONS

The Chinese Office Action for the corresponding Chinese application No. 201280027389.8, issued on Oct. 29, 2014.

* cited by examiner

HYDRAULIC EXCAVATOR

CROSS-REFERENCE TO RELATED APPLICATIONS

This application is a U.S. National stage application of International Application No. PCT/JP2012/080010, filed on Nov. 20, 2012. This U.S. National stage application claims priority under 35 U.S.C. §119(a) to Japanese Patent Application No. 2012-228793, filed in Japan on Oct. 16, 2012, the entire contents of which are hereby incorporated herein by reference.

BACKGROUND

1. Field of the Invention

The present invention relates to a hydraulic excavator.

2. Background Information

An exhaust processing apparatus is mounted to a hydraulic excavator. The exhaust processing apparatus is connected to an engine through a connecting pipe in order to process exhaust from the engine. The exhaust processing apparatus includes a selective catalytic reduction apparatus. The selective catalytic reduction apparatus reduces nitrogen oxide (NOx) in exhaust.

The selective catalytic reduction apparatus processes the exhaust using a reducing agent such as aqueous urea. As a result, it is necessary to arrange a reducing agent tank which retains the reducing agent in the hydraulic excavator. However, there is a possibility that the reducing agent may change form in a high-temperature environment. Therefore, in Japan Patent Laid-open Patent Publication No. 2010-261373, the reducing agent tank is arranged to be dispersed into a plurality of locations in the hydraulic excavator. Then, it is disclosed that, in a high-temperature environment, a change in form of the reducing agent is suppressed by the reducing agent tank being arranged at locations which are separated from sources of heat.

In Japan Patent Laid-open Patent Publication No. 2010-261373, the arrangement of the reducing agent tank is considered but the arrangement of a reducing agent pipe for supplying the reducing agent to the selective catalytic reduction apparatus is not considered at all. However, there is a possibility that the reducing agent which flows in the reducing agent pipe may be change form due to high temperatures in a case where the reducing agent pipe is placed in a high-temperature environment, even when the reducing agent tank is arranged to avoid the high-temperature environment. In particular, the reducing agent may be supplied at an extremely slow speed such as several centimeters per second. In this case, the reducing agent which flows in the reducing agent pipe is significantly affected by heat due to the temperature of the environment in the surroundings of the reducing agent pipe.

In addition, when the reducing agent tank is arranged at a position which is away from an engine compartment in order to avoid the high-temperature environment, the length of the reducing agent pipe is lengthened. When the length of the reducing agent pipe is lengthened, the effects of heat due to the temperature of the environment in the surroundings of the reducing agent pipe tend to increase. In addition, when the length of the reducing agent pipe is lengthened, it is difficult to arrange the reducing agent pipe without interfering with other members. When the reducing agent pipe interferes with the other members, there is a possibility that the reducing agent pipe may be damaged. Alternatively, there may also be a possibility that the reducing agent pipe will be damaged due to external factors.

An object of the present invention is to provide a hydraulic excavator where it is possible to reduce the effects of heat on the reducing agent and where it is possible to protect the reducing agent pipe.

A hydraulic excavator according to a first aspect of the present invention is provided with an engine, a revolving frame, an engine compartment, an exhaust processing unit, a reducing agent injection apparatus, a reducing agent tank, a reducing agent supply pump, and a reducing agent pipe. The revolving frame supports the engine. The engine compartment accommodates the engine. The exhaust processing unit includes a selective catalytic reduction apparatus which processes exhaust from the engine. The exhaust processing unit is arranged inside the engine compartment. The reducing agent injection apparatus is attached to the exhaust processing unit. The reducing agent injection apparatus injects a reducing agent which is supplied to the selective catalytic reduction apparatus. The reducing agent tank is arranged outside the engine compartment. The reducing agent tank retains the reducing agent. The reducing agent supply pump is arranged outside the engine compartment. The reducing agent supply pump supplies the reducing agent from the reducing agent tank to the reducing agent injection apparatus. The reducing agent pipe connects the reducing agent supply pump and the reducing agent injection apparatus. The revolving frame includes a pipe frame. The reducing agent pipe is arranged from the reducing agent supply pump to the reducing agent injection apparatus so as to pass through an inner space of the pipe frame.

A hydraulic excavator according to a second aspect of the present invention is the hydraulic excavator of the first aspect where a vehicle body frame is further provided. The vehicle body frame is disposed on the revolving frame and includes a plurality of column members. The exhaust processing unit is supported by the vehicle body frame. The reducing agent pipe is arranged so as to pass through the inner space of the pipe frame and inner space of the column member of the vehicle body frame.

A hydraulic excavator according to a third aspect of the present invention is the hydraulic excavator of the second aspect where the plurality of column members includes a first column member. The first column member extends upward from the revolving frame toward the exhaust processing unit. The reducing agent pipe is arranged so as to pass through the inner space of the pipe frame and an inner space of the first column member.

A hydraulic excavator according to a fourth aspect of the present invention is the hydraulic excavator of the second aspect where the plurality of column members includes a second column member. The second column member is arranged outside of the exhaust processing unit in the vehicle width direction. The reducing agent pipe is arranged so as to pass through the inner space of the pipe frame and an inner space of the second column member.

A hydraulic excavator according to a fifth aspect of the present invention is the hydraulic excavator of the fourth aspect where an outer cover is further provided. The outer cover is attached to the second column member.

A hydraulic excavator according to a sixth aspect of the present invention is the hydraulic excavator of any of the first to fifth aspects where the revolving frame includes a center frame. The center frame is arranged below the engine. The pipe frame is arranged outside of the center frame in the vehicle width direction.

A hydraulic excavator according to a seventh aspect of the present invention is the hydraulic excavator of any of the first to fifth aspects where the pipe frame is arranged furthest to the outside of the revolving frame in the vehicle width direction.

A hydraulic excavator according to an eighth aspect of the present invention is the hydraulic excavator of any of the first to fifth aspects where the pipe frame extends in the vehicle front and back direction.

A hydraulic excavator according to a ninth aspect of the present invention is the hydraulic excavator of any of the first to fifth aspects, where a fuel tank which retains fuel is further provided. The fuel tank is arranged between the reducing agent supply pump and the engine compartment.

A hydraulic excavator according to a tenth aspect of the present invention is the hydraulic excavator of any of the first to fifth aspects where a hydraulic fluid tank which retains hydraulic fluid is further provided. The hydraulic fluid tank is arranged between the reducing agent supply pump and the engine compartment.

A hydraulic excavator according to an eleventh aspect of the present invention is the hydraulic excavator of any of the second to fifth aspects where a counterweight is further provided. The counterweight is arranged to be adjacent to the engine compartment. The column member through which the reducing agent pipe passes covers at least the counterweight side of the reducing agent pipe.

A hydraulic excavator according to a twelfth aspect of the present invention is the hydraulic excavator of any of the second to fifth aspects where the exhaust processing unit further includes a diesel particulate filter apparatus and a connecting pipe. The diesel particulate filter apparatus processes exhaust from the engine. The connecting pipe connects the selective catalytic reduction apparatus with the diesel particulate filter apparatus. The reducing agent injection apparatus is attached to the connecting pipe. The reducing agent injection apparatus injects the reducing agent into the connecting pipe.

In the hydraulic excavator according to the first aspect of the present invention, the reducing agent tank and the reducing agent supply pump are arranged outside the engine compartment. As a result, it is possible to reduce the effects of heat from the engine compartment with regard to the reducing agent in the reducing agent tank and the reducing agent in the reducing agent supply pump. In addition, the reducing agent pipe is arranged from the reducing agent supply pump to the reducing agent injection apparatus so as to pass through an inner space of the pipe frame. As a result, it is possible to reduce the effects of heat on the reducing agent in the reducing agent pipe even when the reducing agent pipe is lengthened. In addition, since the reducing agent pipe is arranged so as to pass through the inner space of the pipe frame, it is possible to protect the reducing agent pipe using the pipe frame.

In the hydraulic excavator according to the second aspect of the present invention, using the inner space of the column member of the vehicle body frame which supports the exhaust processing unit, it is possible to pass the reducing agent pipe therethrough. Due to this, it is possible to further reduce the effects of heat on the reducing agent in the reducing agent pipe.

In the hydraulic excavator according to the third aspect of the present invention, it is possible to arrange the reducing agent pipe so as to extend upward from the revolving frame toward the exhaust processing unit. Accordingly, it is possible to arrange the reducing agent pipe such that the length of the reducing agent pipe path is as short as possible.

In the hydraulic excavator according to the fourth aspect of the present invention, it is possible to arrange the reducing agent pipe so as to pass through a position which is close to the outside of the vehicle. Due to this, it is possible to further reduce the effects of heat on the reducing agent in the reducing agent pipe.

In the hydraulic excavator according to the fifth aspect of the present invention, it is possible to arrange the reducing agent pipe so as to pass through a position which is close to the outside of the vehicle. Due to this, it is possible to further reduce the effects of heat on the reducing agent in the reducing agent pipe.

In the hydraulic excavator according to the sixth aspect of the present invention, it is possible to arrange the reducing agent pipe so as to pass through a position which is close to the outside of the vehicle. Due to this, it is possible to further reduce the effects of heat on the reducing agent in the reducing agent pipe.

In the hydraulic excavator according to the seventh aspect of the present invention, it is possible to arrange the reducing agent pipe so as to pass through a position which is close to the outside of the vehicle. Due to this, it is possible to further reduce the effects of heat on the reducing agent in the reducing agent pipe.

In the hydraulic excavator according to the eighth aspect of the present invention, the pipe frame extends in the vehicle front and back direction. Accordingly, since it is possible to extend the reducing agent pipe to be longer in the vehicle front and back direction, it is possible to arrange the reducing agent supply pump to be considerably separated from the engine compartment.

In the hydraulic excavator according to the ninth aspect of the present invention, the fuel tank is arranged between the reducing agent supply pump and the engine compartment. Accordingly, it is possible to arrange the reducing agent supply pump to be considerably separated from the engine compartment. Due to this, it is possible to reduce the effects of heat from the engine compartment with regard to the reducing agent in the reducing agent supply pump.

In the hydraulic excavator according to the tenth aspect of the present invention, the hydraulic fluid tank is arranged between the reducing agent supply pump and the engine compartment. Accordingly, it is possible to arrange the reducing agent supply pump to be considerably separated from the engine compartment. Due to this, it is possible to reduce the effects of heat from the engine compartment with regard to the reducing agent in the reducing agent supply pump.

In the hydraulic excavator according to the eleventh aspect of the present invention, the column member through which the reducing agent pipe passes covers at least the counterweight side of the reducing agent pipe. As a result, it is possible to avoid the reducing agent pipe being exposed to the outside even in a case where the counterweight is detached from the vehicle.

In the hydraulic excavator according to the twelfth aspect of the present invention, it is possible to arrange the reducing agent pipe using the inner space of the column member so as to extend to the connecting pipe of the exhaust processing unit which is supported by the vehicle body frame.

DETAILED DESCRIPTION OF THE EMBODIMENTS

Figure 1:
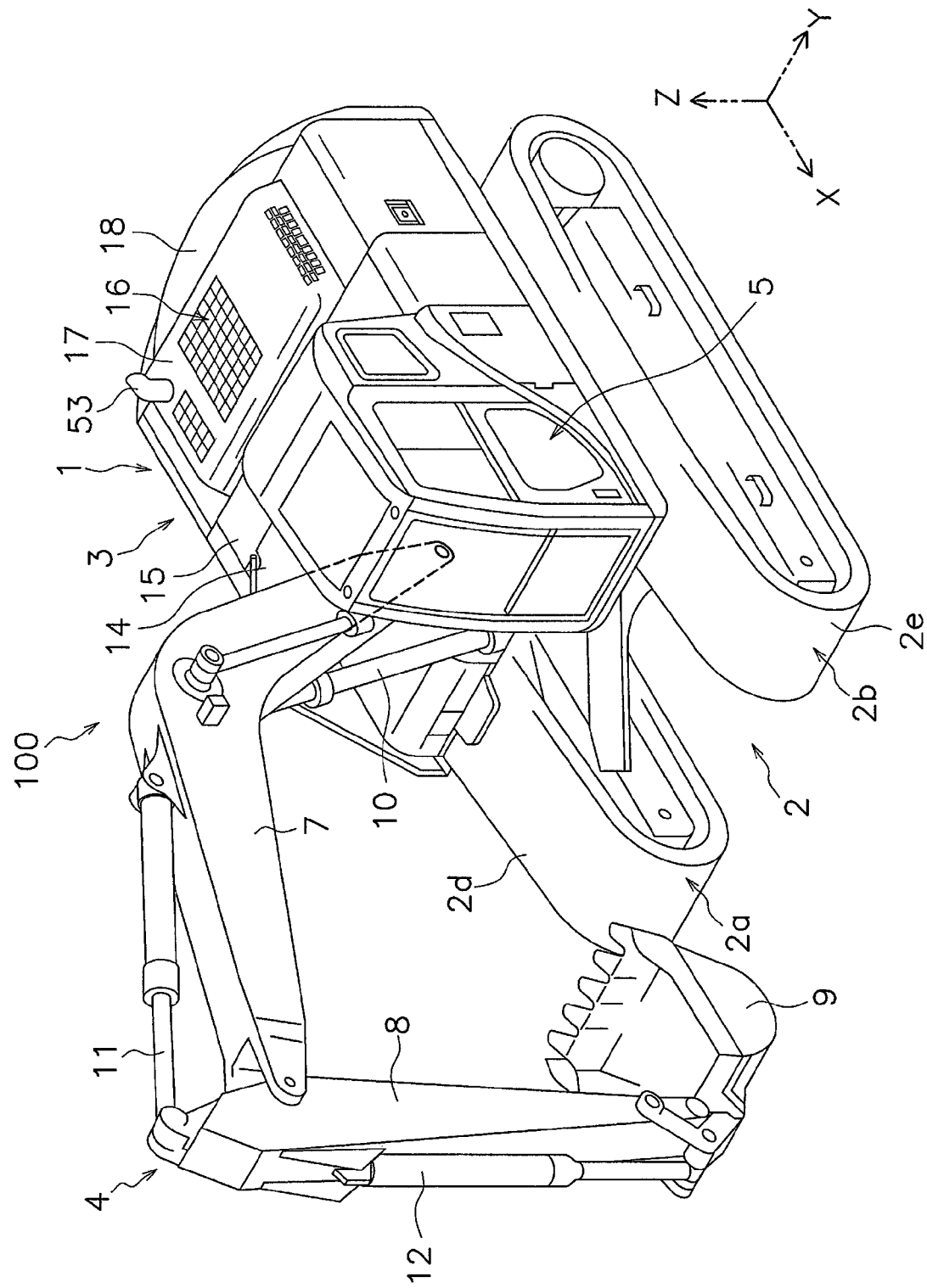
FIG. 1 is a perspective diagram of a hydraulic excavator according to a first embodiment of the present invention.

A hydraulic excavator 100 according to a first embodiment of the present invention is shown in FIG. 1. The hydraulic excavator 100 is provided with a vehicle body 1 and a working implement 4.

The vehicle body 1 has a traveling body 2 and a revolving body 3. The traveling body 2 has a pair of traveling apparatuses 2a and 2b. Each of the traveling apparatuses 2a and 2b has crawler tracks 2d and 2e. The traveling apparatuses 2a and 2b move the hydraulic excavator 100 by the crawler tracks 2d and 2e being driven using the driving force from an engine 21 (refer to FIG. 2) which will be described later.

Here, in the following description, the front and back direction has the meaning of the front and back direction of the vehicle body 1. In other words, the front and back direction is the direction to the front and back as seen by an operator who is seated in a cab 5. In addition, the left and right direction or the lateral direction has the meaning of the vehicle width direction of the vehicle body 1. In other words, the left and right direction, the vehicle width direction, or the lateral direction are the direction to the left and right as seen by the operator described above. In addition, the front and back direction is shown as the x axis, the left and right direction is shown as the y axis, and the up and down direction is shown as the z axis in the diagrams.

The revolving body 3 is mounted on the traveling body 2. The revolving body 3 is provided to be able to revolve with regard to the traveling body 2. In addition, the cab 5 is provided on the revolving body 3. The revolving body 3 has a fuel tank 14, a hydraulic fluid tank 15, an engine compartment 16, and a counterweight 18. The fuel tank 14 retains fuel for driving the engine 21 which will be described later. The fuel tank 14 is arranged in front of the hydraulic fluid tank 15. The hydraulic fluid tank 15 retains hydraulic fluid which is discharged from a hydraulic pump 23 (refer to FIG. 2) which will be described later. The hydraulic fluid tank 15 is arranged to line up with the fuel tank 14 in the front and back direction.

The engine compartment 16 accommodates equipment such as the engine 21 and the hydraulic pump 23 which will be described later. The engine compartment 16 is arranged behind the cab 5, the fuel tank 14, and the hydraulic fluid tank 15. Above the engine compartment 16 is covered by an engine hood 17. The counterweight 18 is arranged to be adjacent to the engine compartment 16. In detail, the counterweight 18 is arranged behind the engine compartment 16.

The working implement 4 is attached to a center position of a front section of the revolving body 3. The working implement 4 has a boom 7, an arm 8, a bucket 9, a boom cylinder 10, an arm cylinder 11, and a bucket cylinder 12. The base end section of the boom 7 is rotatably joined to the revolving body 3. In addition, the front end section of the boom 7 is rotatably joined to the base end section of the arm 8. The front end section of the arm 8 is rotatably joined to the bucket 9. The boom cylinder 10, the arm cylinder 11, and the bucket cylinder 12 are hydraulic cylinders and are driven using the hydraulic fluid which is discharged from the hydraulic pump 23 which will be described later. The boom cylinder 10 operates the boom 7. The arm cylinder 11 operates the arm 8. The bucket cylinder 12 operates the bucket 9. The working implement 4 is driven by the driving of the cylinders 10, 11 and 12.

Figure 2:
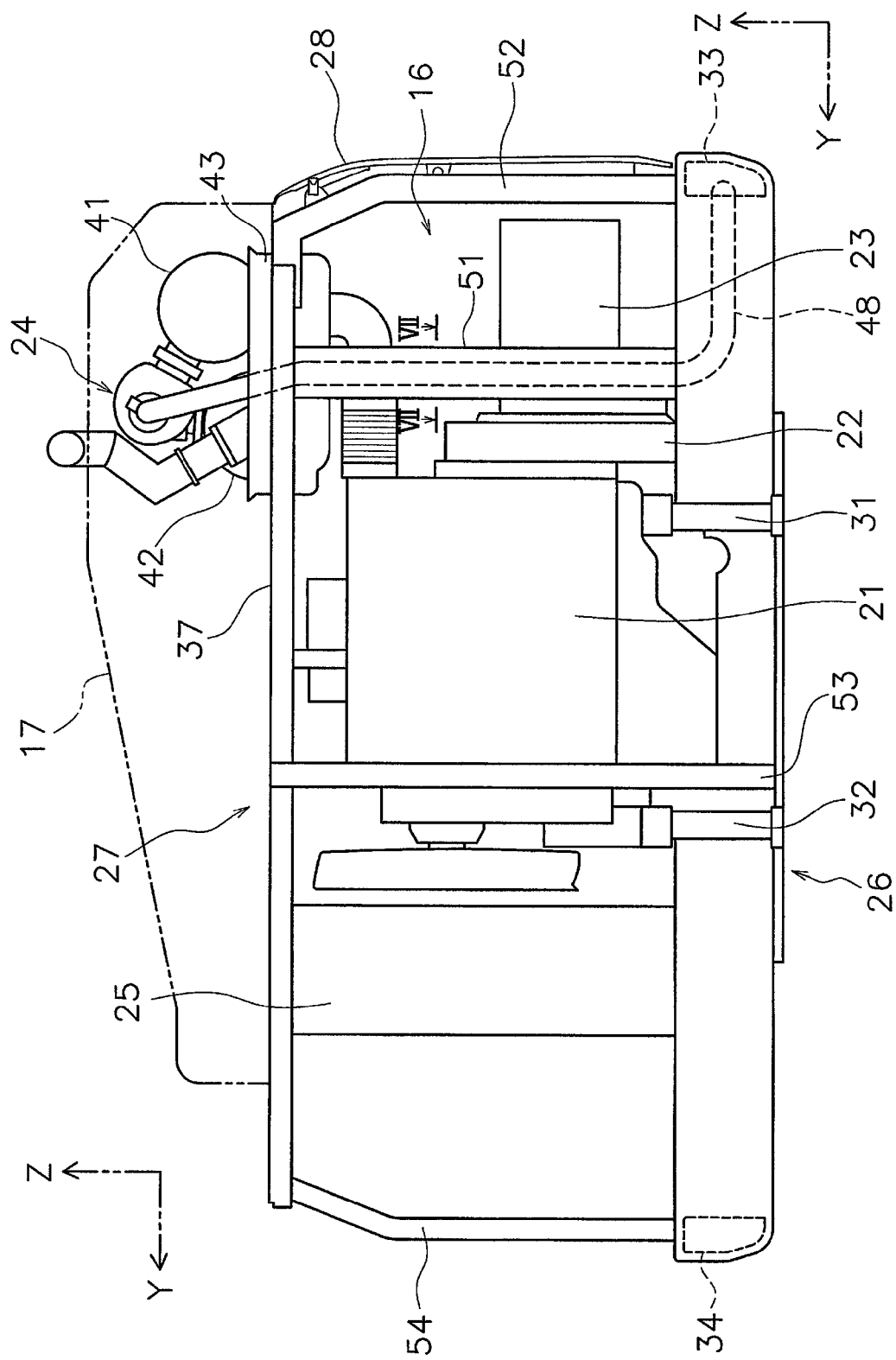
FIG. 2 is a diagram where an internal configuration of an engine compartment of the hydraulic excavator is viewed from behind.

FIG. 2 is a diagram where the internal configuration of the engine compartment 16 is viewed from behind. As shown in FIG. 2, the engine 21, a flywheel housing 22, the hydraulic pump 23, and an exhaust processing unit 24 are arranged in the engine compartment 16. In addition, a cooling apparatus 25 which includes a radiator or an oil cooler is arranged in the engine compartment 16. The cooling apparatus 25, the engine 21, the flywheel housing 22, and the hydraulic pump 23 are arranged to line up in the vehicle width direction.

The hydraulic pump 23 is arranged on a first lateral direction side of the engine 21. The first lateral direction in the present embodiment is to the right. Here, in the following description, the direction which is opposite to the first lateral direction in the vehicle width direction is referred to as a second lateral direction. The second lateral direction in the present embodiment is to the left.

Figure 3:
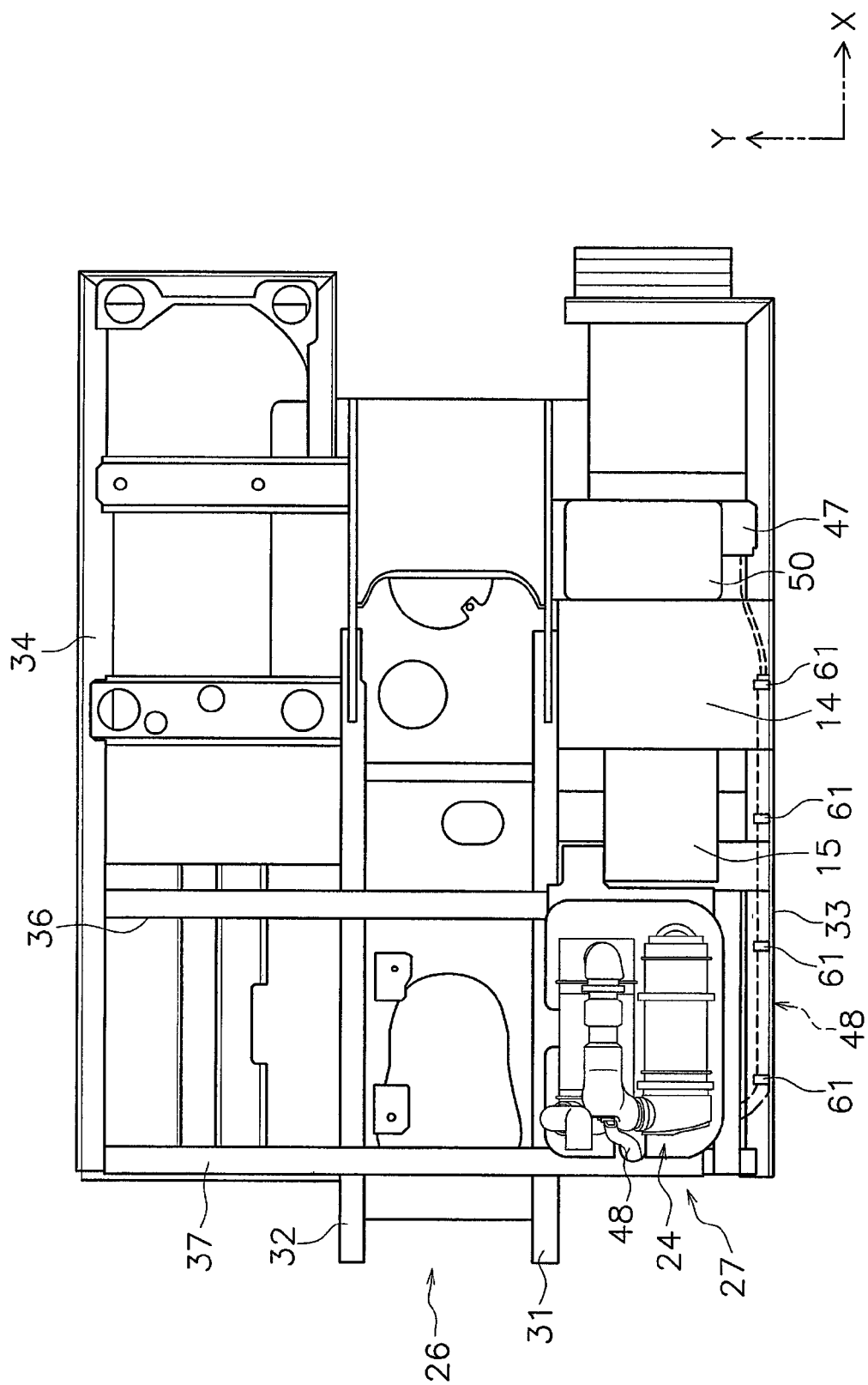
FIG. 3 is a planar diagram of the revolving frame and the vehicle body frame of the hydraulic excavator.

FIG. 3 is a planar diagram of a revolving frame 26 and a vehicle body frame 27. The hydraulic excavator 100 has the revolving frame 26 and the vehicle body frame 27. The revolving frame 26 includes center frames 31 and 32 which extend in the front and back direction. The center frames 31 and 32 are arranged below the engine 21 (refer to FIG. 2). The center frames 31 and 32 support the engine 21 via a rubber damper. The center frames 31 and 32 include a first center frame 31 and a second center frame 32.

Figure 4:
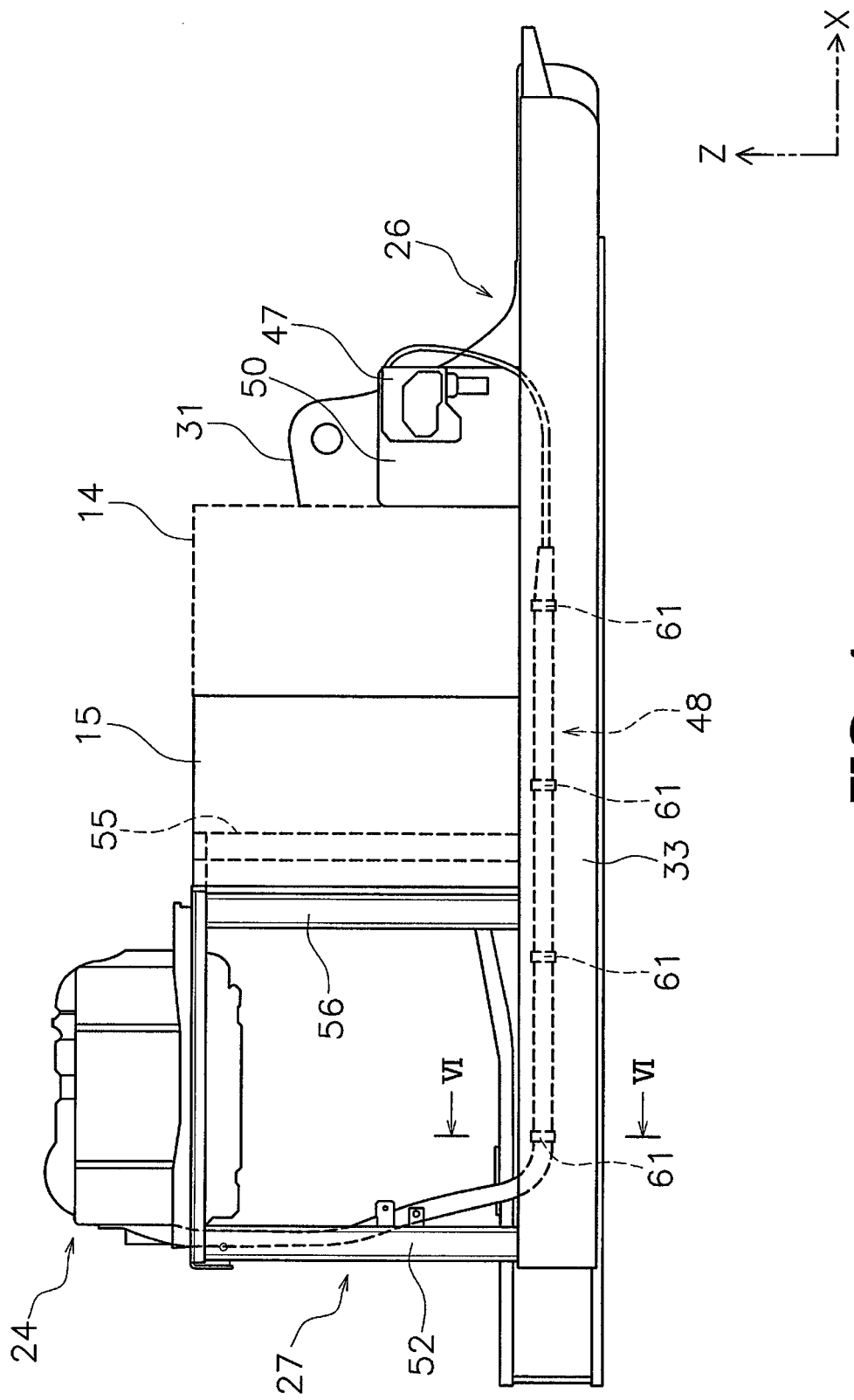
FIG. 4 is a side surface diagram of the revolving frame and the vehicle body frame.

FIG. 4 is a side surface diagram of the revolving frame 26 and the vehicle body frame 27. Here, in FIG. 3 and FIG. 4, for ease of understanding, apparatuses such as a portion of the vehicle body frame 27, the engine 21, and the hydraulic pump 23 are omitted.

As shown in FIG. 2 to FIG. 4, the revolving frame 26 includes a first pipe frame 33 and a second pipe frame 34. The first pipe frame 33 and the second pipe frame 34 each extend in the vehicle front and back direction. The first pipe frame 33 is arranged outside of the center frames 31 and 32 in the vehicle width direction. In detail, the first pipe frame 33 is arranged on the first lateral direction side of the center frames 31 and 32. The first pipe frame 33 is arranged furthest to the outside of the revolving frame 26 in the vehicle width direction. The second pipe frame 34 is arranged outside of the center frames 31 and 32 in the vehicle width direction. In detail, the second pipe frame 34 is arranged on the second lateral direction side of the center frames 31 and 32.

The vehicle body frame 27 is erected on the revolving frame 26. The vehicle body frame 27 is arranged in the engine compartment 16. As shown in FIG. 2, the vehicle body frame 27 is arranged in the surroundings of the equipment such as the engine 21 and the hydraulic pump 23. An outer cover 28 is attached to the vehicle body frame 27. Here, only a portion of the outer cover 28 is shown in FIG. 2. The engine hood 17 shown in FIG. 1 is also attached to the vehicle body frame 27.

As shown in FIG. 2 to FIG. 4, the vehicle body frame 27 includes a plurality of column members 51 to 56 and a plurality of beam members 36 and 37. The column members 51 to 56 are arranged so as to extend upward from the revolving frame 26. The beam members 36 and 37 are supported by the column members 51 to 56. In detail, as shown in FIG. 3, the plurality of beam members 36 and 37 include a first beam member 36 and a second beam member 37. The first beam member 36 and the second beam member 37 are arranged to be separated from each other in the front and back direction.

As shown in FIG. 2, the plurality of column members 51 to 56 includes a first column member 51 and a second column member 52. The first column member 51 extends upward from the revolving frame 26 toward the exhaust processing unit 24. The second column member 52 is arranged to the outside of the exhaust processing unit 24 in the vehicle width direction. The second column member 52 is arranged to the outside of the engine 21 in the vehicle width direction. In other words, the second column member 52 is arranged at the first lateral direction side of the exhaust processing unit 24. The outer cover 28 is attached to the second column member 52.

As shown in FIG. 2, the plurality of column members 51 to 56 includes a third column member 53 and a fourth column member 54. The third column member 53 is arranged between the first center frame 31 and the second center frame 32 in the vehicle width direction. The fourth column member 54 is arranged to the second lateral direction side of the second center frame 32. An outer cover (which is not shown in the diagram) is attached to the fourth column member 54. The first column member 51, the second column member 52, the third column member 53, and the fourth column member 54 support the second beam member 37.

As shown in FIG. 4, the plurality of column members 51 to 56 includes a fifth column member 55 and a sixth column member 56. The fifth column member 55 and the sixth column member 56 are arranged forward of the first to fourth column members 51 to 54. The fifth column member 55 and the sixth column member 56 are arranged to the first lateral direction side of the first center frame 31. The fifth column member 55 and the sixth column member 56 support the first beam member 36 along with column members (which are not shown in the diagram) which are arranged to the second lateral side of the second center frame 32.

As shown in FIG. 2, the hydraulic pump 23 is arranged in the lateral direction from the engine 21. That is, the hydraulic pump 23 is arranged to line up with the engine 21 in the vehicle width direction. The hydraulic pump 23 is driven by the engine 21. The hydraulic pump 23 is arranged at a position which is lower than the upper surface of the engine 21.

The flywheel housing 22 is arranged between the engine 21 and the hydraulic pump 23. The flywheel housing 22 is attached to the side surface of the engine 21. In addition, the hydraulic pump 23 is attached to the side surface of the flywheel housing 22.

The exhaust processing unit 24 has a diesel particulate filter apparatus 41, a selective catalytic reduction apparatus 42, and a bracket 43. The exhaust processing unit 24 is arranged above the hydraulic pump 23.

Figure 5:
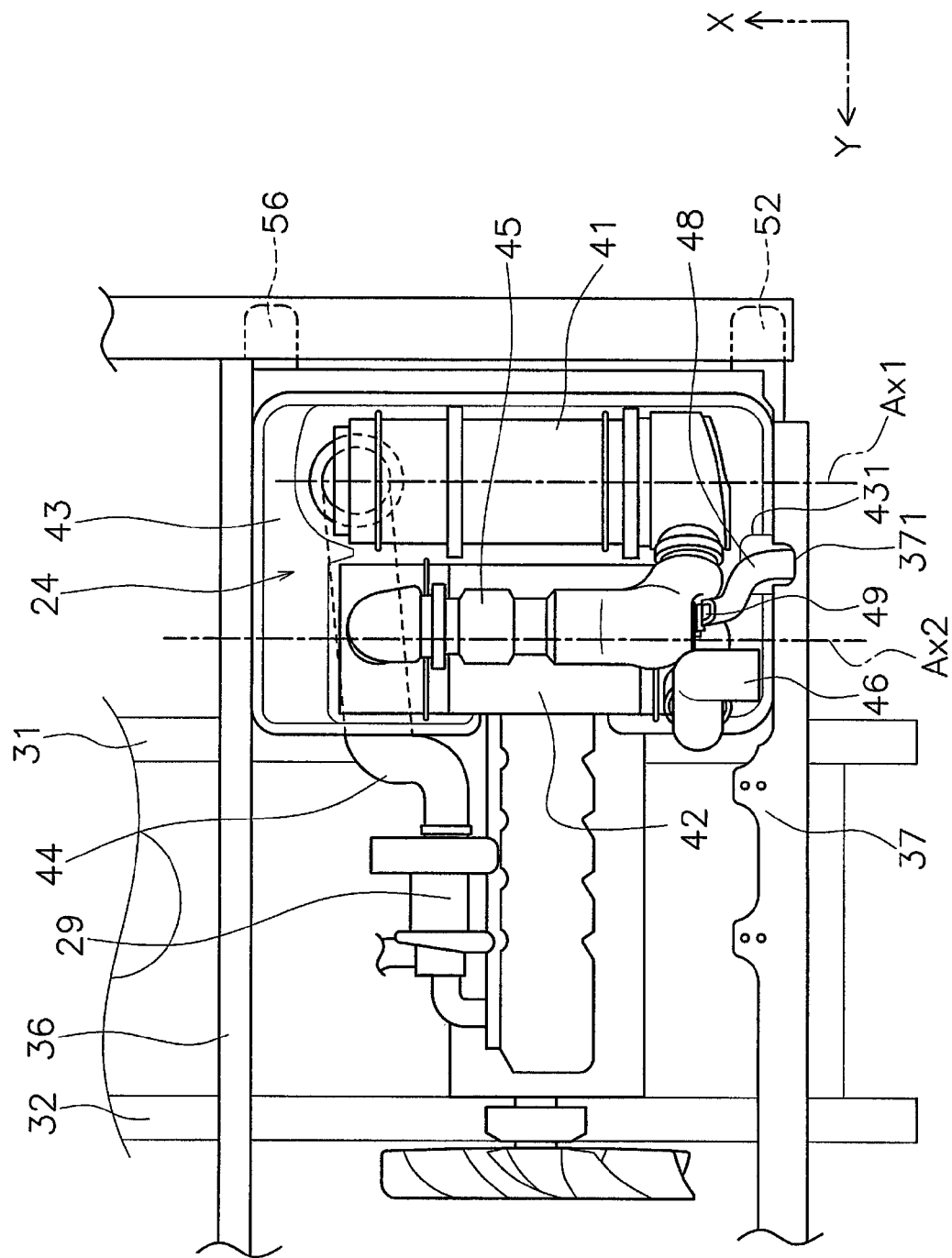
FIG. 5 is an upper surface diagram illustrating an internal configuration of the engine compartment.

FIG. 5 is an upper surface diagram illustrating the internal configuration of the engine compartment 16. As shown in FIG. 5, the first beam member 36 is arranged forward of the engine 21. The second beam member 37 is arranged rearward of the engine 21. The exhaust processing unit 24 is arranged to span between the first beam member 36 and the second beam member 37. The exhaust processing unit 24 is supported by the beam members. That is, the diesel particulate filter apparatus 41 and the selective catalytic reduction apparatus 42 are supported by the vehicle body frame 27.

The diesel particulate filter apparatus 41 is an apparatus which processes exhaust from the engine 21. The diesel particulate filter apparatus 41 captures the particulate matter which is included in the exhaust using a filter. The diesel particulate filter apparatus 41 incinerates the captured particulate matter using a heater which is installed in the filter.

The diesel particulate filter apparatus 41 is arranged in a state where the longitudinal direction of the diesel particulate filter apparatus 41 is perpendicular to a first direction. The first direction is a predetermined direction on a horizontal plane and is the vehicle width direction in the present embodiment.

The engine 21, the selective catalytic reduction apparatus 42, and the diesel particulate filter apparatus 41 are arranged such that the respective projections of the engine 21, the selective catalytic reduction apparatus 42, and the diesel particulate filter apparatus 41 with regard to the horizontal plane are lined up in the first direction in the order of the engine 21, the selective catalytic reduction apparatus 42, and the diesel particulate filter apparatus 41. As shown in FIG. 5, the engine 21, the selective catalytic reduction apparatus 42, and the diesel particulate filter apparatus 41 are arranged to line up in this order in the first direction, that is, the vehicle width direction in a planar view of the vehicle. Accordingly, the diesel particulate filter apparatus 41 is positioned to be further from the engine 21 than the selective catalytic reduction apparatus 42. In other words, the selective catalytic reduction apparatus 42 is arranged on the first lateral direction side of the engine 21. The diesel particulate filter apparatus 41 is arranged on the first lateral direction side of the selective catalytic reduction apparatus 42.

The selective catalytic reduction apparatus 42 is an apparatus which processes exhaust from the engine 21. The selective catalytic reduction apparatus 42 selectively reduces nitrogen oxide NOx by hydrolyzation of urea. The selective catalytic reduction apparatus 42 is arranged in a state where the longitudinal direction of the selective catalytic reduction apparatus 42 is perpendicular to the first direction.

The hydraulic excavator 100 is provided with a first connecting pipe 44. As shown in FIG. 5, one end of the first connecting pipe 44 is connected to an exhaust port of the engine 21 via a supercharger 29. The other end of the first connecting pipe 44 is connected to the diesel particulate filter apparatus 41. That is, the first connecting pipe 44 joins the engine 21 and the diesel particulate filter apparatus 41. The first connecting pipe 44 is positioned below the exhaust processing unit 24.

The exhaust processing unit 24 has a second connecting pipe 45. One end of the second connecting pipe 45 is connected to the diesel particulate filter apparatus 41. The other end of the second connecting pipe 45 is connected to the selective catalytic reduction apparatus 42. That is, the second connecting pipe 45 connects the diesel particulate filter apparatus 41 and the selective catalytic reduction apparatus 42. The second connecting pipe 45 is positioned above the selective catalytic reduction apparatus 42.

The hydraulic excavator 100 is provided with a third connecting pipe 46. One end of the third connecting pipe 46 is connected to the selective catalytic reduction apparatus 42. The other end of the third connecting pipe 46 protrudes upward from the engine hood 17.

The engine 21, the first connecting pipe 44, the diesel particulate filter apparatus 41, the second connecting pipe 45, the selective catalytic reduction apparatus 42, and the third connecting pipe 46 are connected in this order in series. Accordingly, exhaust from the engine 21 passes through the first connecting pipe 44 and is fed into the diesel particulate filter apparatus 41. In the diesel particulate filter apparatus 41, particulate matter is mostly reduced from in the exhaust. Next, the exhaust passes through the second connecting pipe 45 and is fed into the selective catalytic reduction apparatus 42. In the selective catalytic reduction apparatus 42, NOx is mostly reduced. After this, the exhaust which has been cleaned passes through the third connecting pipe 46 and is discharged to the outside.

The bracket 43 joins the selective catalytic reduction apparatus 42 and the diesel particulate filter apparatus 41. As a result, the selective catalytic reduction apparatus 42, the diesel particulate filter apparatus 41, and the bracket 43 are integrated. The bracket 43 is attached to the vehicle body frame 27 through a fixing means such as bolts so as to be able to be attached and detached. Accordingly, it is possible to detach the exhaust processing unit 24 from the vehicle by detaching the bracket 43 from the vehicle body frame 27.

As shown in FIG. 5, the reducing agent injection apparatus 49 is attached to the exhaust processing unit 24. In detail, the reducing agent injection apparatus 49 is attached to the second connecting pipe 45. The reducing agent injection apparatus 49 injects the reducing agent into the second connecting pipe 45. The reducing agent which is injected from the reducing agent injection apparatus 49 is supplied to the selective catalytic reduction apparatus 42.

As shown in FIG. 3 and FIG. 4, the hydraulic excavator is provided with a reducing agent tank 50 and a reducing agent supply pump 47. The reducing agent tank 50 retains the reducing agent which is supplied to the selective catalytic reduction apparatus 42. The reducing agent supply pump 47 is attached to the reducing agent tank 50. The reducing agent supply pump 47 supplies the reducing agent from the reducing agent tank 50 to the reducing agent injection apparatus 49. The reducing agent supply pump 47 is arranged outside the engine compartment 16. In detail, the reducing agent supply pump 47 is arranged forward of the engine compartment 16. The reducing agent supply pump 47 is arranged above the first pipe frame 33.

As shown in FIG. 3 and FIG. 4, the fuel tank 14 and the hydraulic fluid tank 15 are arranged to line up in the front and back direction. The reducing agent supply pump 47 is arranged forward of the fuel tank 14 and the hydraulic fluid tank 15. The fuel tank 14 is arranged between the reducing agent supply pump 47 and the engine compartment 16. The hydraulic fluid tank 15 is arranged between the reducing agent supply pump 47 and the engine compartment 16.

A reducing agent pipe 48 is connected to the reducing agent injection apparatus 49. The reducing agent pipe 48 connects the reducing agent supply pump 47 and the reducing agent injection apparatus 49. As shown in FIG. 2 to FIG. 4, the reducing agent pipe 48 is arranged from the reducing agent supply pump 47 to the reducing agent injection apparatus 49 so as to pass through the inner space of the first pipe frame 33 and the inner space of the first column member 51 of the vehicle body frame.

In detail, as shown in FIG. 3, the reducing agent pipe 48 extends in the front and back direction in the inner space of the first pipe frame 33. The reducing agent pipe 48 bends from a rear section of the first pipe frame 33 toward the first column member 51. As shown in FIG. 2, the reducing agent pipe 48 bends upward in the lower section of the first column member 51. The reducing agent pipe 48 extends in the up and down direction in the inner space of the first column member 51.

As shown in FIG. 5, a concave section 371 through which the reducing agent pipe 48 passes is formed in the second beam member 37. In addition, a concave section 431 through which the reducing agent pipe 48 passes is formed in the bracket 43 of the exhaust processing unit 24. The reducing agent pipe 48 protrudes upward from the inner space of the first column member 51 and passes through the concave section 371 of the second beam member 37 and the concave section 431 of the bracket 43. Then, the upper end section of the reducing agent pipe 48 is connected to the reducing agent injection apparatus 49.

Figure 6:
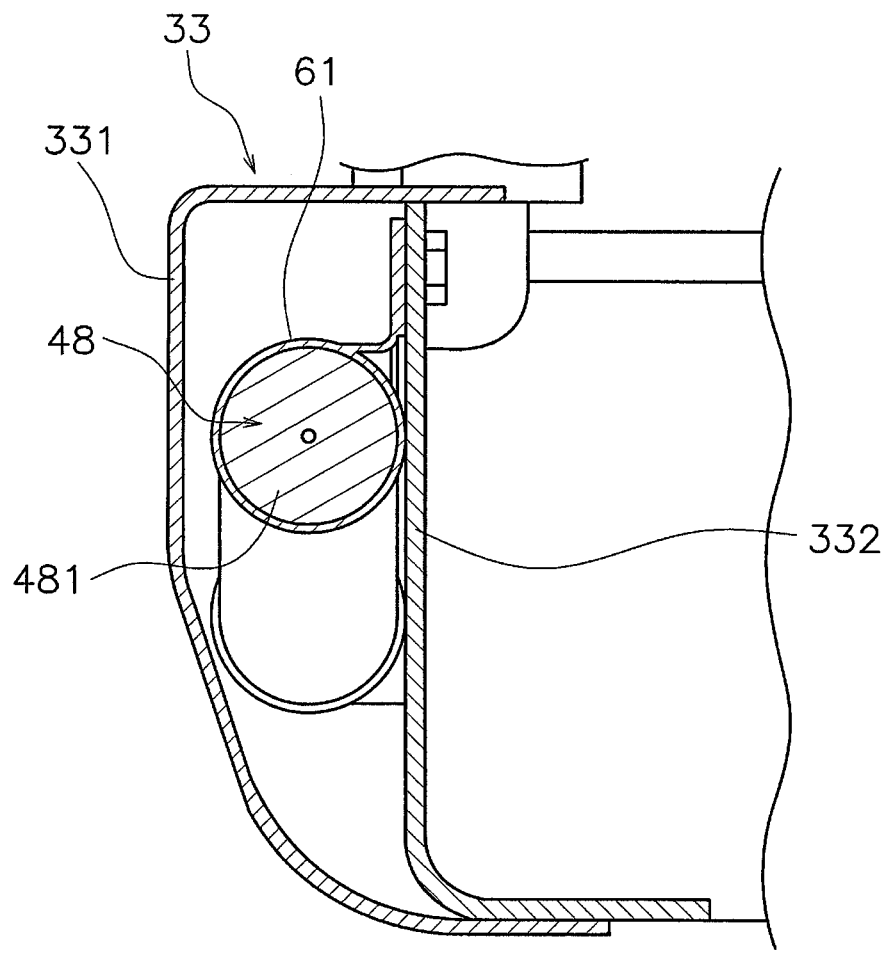
FIG. 6 is a cross sectional diagram of VI-VI in FIG. 4.

The reducing agent pipe 48 is fixed to the first pipe frame 33 in the inner space of the first pipe frame 33 by a fixing member 61 such as a clamp. FIG. 6 is a cross sectional diagram of VI-VI in FIG. 4. As shown in FIG. 6, the first pipe frame 33 has an outer wall section 331 and an inner wall section 332. The inner space of the first pipe frame 33 is closed off by the outer wall section 331 and the inner wall section 332. The outer wall section 331 covers the outside of the reducing agent pipe 48 in the vehicle width direction. The inner wall section 332 covers the inner side of the reducing agent pipe 48 in the vehicle width direction. The fixing member 61 fixes the reducing agent pipe 48 to the first pipe frame 33. In detail, the fixing member 61 fixes the reducing agent pipe 48 to the inner wall section 332.

Figure 7:
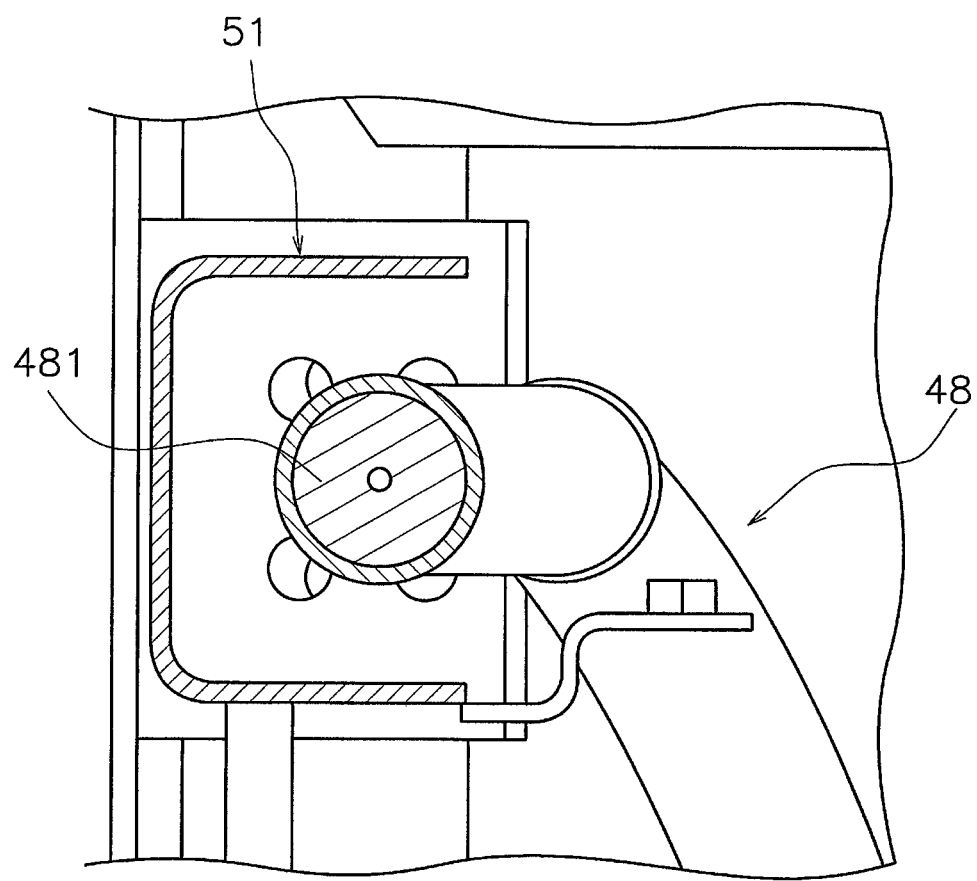
FIG. 7 is a cross sectional diagram of VII-VII in FIG. 2.

FIG. 7 is a cross sectional diagram of VII-VII in FIG. 2. As shown in FIG. 7, the first column member 51 has a shape of a box where the front is opened. The first column member 51 covers both lateral directions and the rear of the reducing agent pipe 48. The counterweight 18 described above is arranged behind the first column member 51. Accordingly, the first column member 51 covers at least the counterweight 18 side of the reducing agent pipe 48.

Here, a portion which is arranged in the inner space of the first pipe frame 33 and a portion on the downstream side from this portion in the reducing agent pipe 48 have an insulation material 481 (refer to FIG. 6 and FIG. 7). In other words, the portion which is positioned below the hydraulic fluid tank 15 and the portion on the downstream side from this portion in the reducing agent pipe 48 have the insulation material 481.

The hydraulic excavator 100 according to the present embodiment is provided with the following features.

The reducing agent supply pump 47 is arranged outside the engine compartment 16. As a result, it is possible to reduce the effects of heat from the engine compartment 16 with regard to the reducing agent inside the reducing agent supply pump 47.

The reducing agent pipe 48 is arranged so as to extend from the reducing agent supply pump 47 to the reducing agent injection apparatus 49 so as to pass through the inner space of the first pipe frame 33 and the inner space of the first column member 51. As a result, it is possible to reduce the effects of heat on the reducing agent inside the reducing agent pipe 48 even when the total length of the reducing agent pipe 48 is lengthened.

Since the reducing agent pipe 48 is arranged so as to pass through the inner space of the first pipe frame 33, the reducing agent pipe 48 is protected by the first pipe frame 33. In addition, since the reducing agent pipe 48 is arranged so as to pass through the inner space of the first column member 51, the reducing agent pipe 48 is protected by the first column member 51.

The first column member 51 covers the counterweight 18 side of the reducing agent pipe 48. As a result, it is possible to suppress the first column member 51 from being exposed to the outside even when the counterweight 18 is detached.

Above, embodiments of the present invention have been described but the present invention is not limited to the embodiments described above and various modifications are possible in a scope which does not depart from the gist of the invention.

The first direction is not limited to the vehicle width direction and may be another direction. That is, the diesel particulate filter apparatus 41 and the selective catalytic reduction apparatus 42 may be arranged so as to line up in a direction which is different to the vehicle width direction. For example, the first direction may be the vehicle front and back direction. That is, the diesel particulate filter apparatus 41 and the selective catalytic reduction apparatus 42 may be arranged to line up in the vehicle front and back direction.

Figure 8:
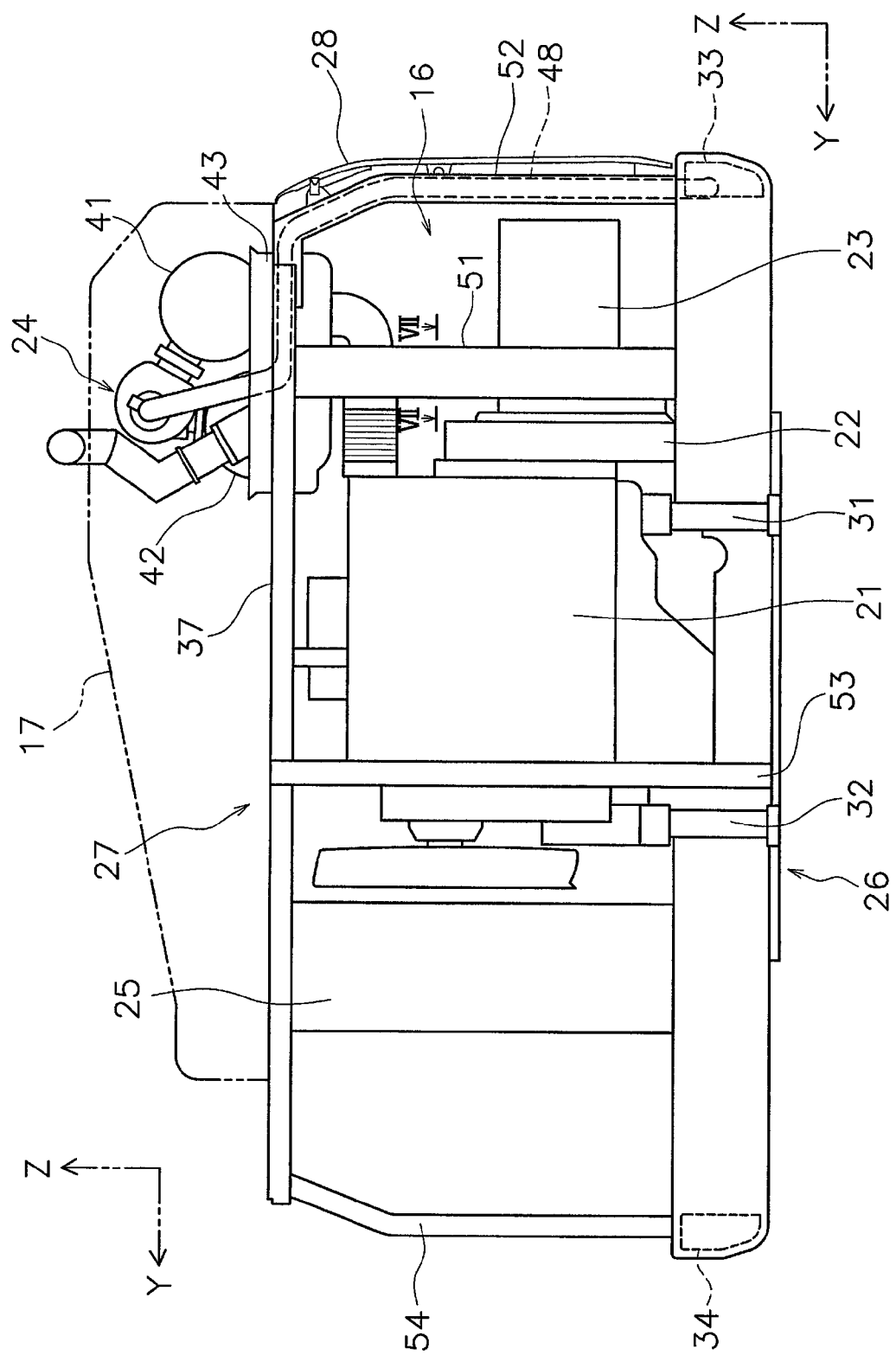
FIG. 8 is a diagram where the internal configuration of the engine compartment of the hydraulic excavator according to another embodiment is viewed from behind.

The reducing agent pipe 48 may be arranged so as to pass through the inner space of a column member other than the first column member 51. For example, as shown in FIG. 8, the reducing agent pipe 48 may be arranged so as to pass through the inner space of the second column member 52.

The first pipe frame 33 may be arranged inside the other members of the revolving frame 26 in the vehicle width direction. However, from the point of view of reducing the effects of heat on the reducing agent pipe 48, it is preferable that the first pipe frame 33 be arranged furthest to the outside of the revolving frame 26 in the vehicle width direction as in the embodiments described above.

The arrangement of the revolving frame 26, the vehicle body frame, and the reducing agent pipe 48 may be arranged to be reversed from left to right with respect to the arrangement in the embodiments described above. That is, the first lateral direction is to the right and the second lateral direction is to the left in the embodiments described above, but in contrast to this, the first lateral direction may be to the left and the second lateral direction may be to the right. Accordingly, the first pipe frame 33 through which the reducing agent pipe 48 passes may be arranged to the left rather than to the right of the center frames 31 and 32. In addition, the first column member 51 through which the reducing agent pipe 48 passes may be arranged to the left rather than to the right of the center frames 31 and 32.

According to the illustrated embodiment, it is possible to provide a hydraulic excavator where, in addition to eliminating difficulties when connecting the engine and the exhaust processing apparatus, it is possible to reduce load on a connecting pipe due to vibration.

The invention claimed is:

1. A hydraulic excavator comprising:
    an engine;
    a revolving frame supporting the engine, the revolving frame including a pipe frame;
    an engine compartment accommodating the engine;
    an exhaust processing unit arranged inside the engine compartment, the exhaust processing unit including a selective catalytic reduction apparatus configured to process exhaust from the engine;
    a reducing agent injection apparatus attached to the exhaust processing unit, the reducing agent injection apparatus being configured to inject a reducing agent supplied to the selective catalytic reduction apparatus;
    a reducing agent tank configured to retain the reducing agent, the reducing agent tank being arranged outside the engine compartment;
    a reducing agent supply pump arranged outside the engine compartment, the reducing agent supply pump being configured to supply the reducing agent from the reducing agent tank to the reducing agent injection apparatus;
    a reducing agent pipe connecting the reducing agent supply pump and the reducing agent injection apparatus, the reducing agent pipe being arranged from the reducing agent supply pump to the reducing agent injection apparatus so as to pass through an inner space of the pipe frame; and
    a vehicle body frame erected on the revolving frame, the vehicle body frame including a plurality of column members,
    the exhaust processing unit being supported by the vehicle body frame,
    the reducing agent pipe being arranged so as to pass through the inner space of the pipe frame and an inner space of one of the column members of the vehicle body frame, one column member having an open cross sectional shape and being arranged such that an open side of the cross sectional shape faces toward the reducing agent pipe and a closed side of the cross sectional shape is arranged closer to an outside of the hydraulic excavator than the reducing agent pipe.

2. The hydraulic excavator according to claim 1, wherein the plurality of column members includes a first column member extending upward from the revolving frame toward the exhaust processing unit, and
    the reducing agent pipe is arranged so as to pass through the inner space of the pipe frame and an inner space of the first column member.

3. The hydraulic excavator according to claim 1, wherein the plurality of column members includes a second column member arranged outside of the exhaust processing unit in a vehicle width direction, and
    the reducing agent pipe is arranged so as to pass through the inner space of the pipe frame and an inner space of the second column member.

4. The hydraulic excavator according to claim 3, further comprising
    an outer cover,
    wherein the outer cover is attached to the second column member.

5. The hydraulic excavator according to claim 1, wherein the revolving frame includes a center frame arranged below the engine, and
    the pipe frame is arranged outside of the center frame in a vehicle width direction.

6. The hydraulic excavator according to claim 1, wherein the pipe frame is arranged furthest to the outside of the revolving frame in a vehicle width direction.

7. The hydraulic excavator according to claim 1, wherein the pipe frame extends in a vehicle front and back direction.

8. The hydraulic excavator according to claim 1, further comprising
    a fuel tank configured to retain fuel,
    wherein the fuel tank is arranged between the reducing agent supply pump and the engine compartment.

9. The hydraulic excavator according to claim 1, further comprising
    a hydraulic fluid tank configured to retain hydraulic fluid,
    wherein the hydraulic fluid tank is arranged between the reducing agent supply pump and the engine compartment.

10. The hydraulic excavator according to claim 1, further comprising
    a counterweight arranged adjacent to the engine compartment,
    wherein the one of the column members through which the reducing agent pipe passes covers at least a counterweight side of the reducing agent pipe.

11. The hydraulic excavator according to claim 1, wherein the exhaust processing unit further includes:
    a diesel particulate filter apparatus configured to process exhaust from the engine; and
    a connecting pipe connecting the diesel particulate filter apparatus and the selective catalytic reduction apparatus, and
    the reducing agent injection apparatus is attached to the connecting pipe and configured to inject the reducing agent into the connecting pipe.

12. The hydraulic excavator according to claim 1, wherein the one column member is arranged such that the open side of the cross sectional shape faces in a frontward direction of the hydraulic excavator and the closed side of the cross sectional shape faces in a rearward direction of the hydraulic excavator.

13. The hydraulic excavator according to claim 12, further comprising
a counterweight arranged rearward of the engine compartment,
the one of the column members through which the reducing agent pipe passes covers at least a counterweight side of the reducing agent pipe.

14. The hydraulic excavator according to claim 1, wherein the open cross-sectional shape is a box-like shape with one side opened.

* * * * *